(12) United States Patent
Li et al.

(10) Patent No.: US 9,344,134 B2
(45) Date of Patent: May 17, 2016

(54) MOBILE TERMINAL THAT DETERMINES A TYPE OF AN EXTERNAL DEVICE

(75) Inventors: Zhaohui Li, Shenzhen (CN); Jinxing Ning, Shenzhen (CN)

(73) Assignee: ZTE CORPORATION (CN)

( * ) Notice: Subject to any disclaimer, the term of this patent is extended or adjusted under 35 U.S.C. 154(b) by 142 days.

(21) Appl. No.: 14/126,493

(22) PCT Filed: Aug. 16, 2011

(86) PCT No.: PCT/CN2011/078494
§ 371 (c)(1),
(2), (4) Date: Dec. 16, 2013

(87) PCT Pub. No.: WO2012/171258
PCT Pub. Date: Dec. 20, 2012

(65) Prior Publication Data
US 2014/0141845 A1    May 22, 2014

(30) Foreign Application Priority Data
Jun. 15, 2011   (CN) .......................... 2011 1 0160881

(51) Int. Cl.
*H04M 1/00*    (2006.01)
*H04B 1/3827*    (2015.01)
(Continued)

(52) U.S. Cl.
CPC ............ *H04B 1/3833* (2013.01); *H02J 7/0027* (2013.01); *H02J 7/0086* (2013.01);
(Continued)

(58) Field of Classification Search
CPC ............ H02J 2007/0062; H02J 7/0055; H02J 7/0036; G06F 13/4081; G06F 1/266; G06F 13/385; H01M 10/44; H04B 5/02; H04B 1/034; H04B 1/3816; H04M 2250/12; H04M 1/72527
USPC .............................................. 455/550.1–90.3
See application file for complete search history.

(56) References Cited

U.S. PATENT DOCUMENTS

| | | | |
|---|---|---|---|
| 5,783,926 A * | 7/1998 | Moon | ........................... 320/106 |
| 6,844,846 B1 * | 1/2005 | Riday | ..................... G01S 19/35 342/357.52 |

(Continued)

FOREIGN PATENT DOCUMENTS

| | | |
|---|---|---|
| CN | 101411035 | 4/2009 |
| CN | 101411035 A | 4/2009 |

(Continued)

OTHER PUBLICATIONS

International Search Report for corresponding application PCT/CN2011/078494 filed Aug. 16, 2011; Mail date Mar. 22, 2012.
(Continued)

*Primary Examiner* — Ronald Eisner
(74) *Attorney, Agent, or Firm* — Cantor Colburn LLP

(57) ABSTRACT

The disclosure provides a mobile terminal and a processing method thereof; the method includes the following steps: when detecting that an external device is plugged in, the mobile terminal determines the type of the external device according to the logic levels of the internal data signal lines in the mobile terminal, wherein the type includes a charger and a Universal Serial Bus (USB) host device; the mobile terminal charges itself or transmits data with the external device according to the determined type of the external device. With the disclosure, the performance of the mobile terminal is improved, and the user experience is enhanced.

8 Claims, 5 Drawing Sheets a mobile terminal determines the type of an external device according to the logic levels of the internal data signal lines in the mobile terminal when the mobile terminal detects that the external device is plugged in, wherein the type includes a charger and a USB host device — S102

The mobile terminal charges itself or transmits data with the external device according to the determined type of the external device — S104

(51) Int. Cl.
*H04M 1/725* (2006.01)
*H02J 7/00* (2006.01)

(52) U.S. Cl.
CPC .......... *H04M1/72527* (2013.01); *H02J 7/0091* (2013.01); *H02J 2007/0062* (2013.01); *H02J 2007/0096* (2013.01)

(56) References Cited

U.S. PATENT DOCUMENTS

| | | | | |
|---|---|---|---|---|
| 8,259,221 B1 * | 9/2012 | Kaplan | ................. | H02J 7/0055 320/114 |
| 9,030,152 B2 * | 5/2015 | Liang | .................... | H02J 7/0068 320/103 |
| 2010/0127666 A1 | 5/2010 | Ball | | |

FOREIGN PATENT DOCUMENTS

| | | |
|---|---|---|
| CN | 101494694 | 7/2009 |
| CN | 101674343 | 3/2010 |
| CN | 101674366 A | 3/2010 |
| CN | 101917032 | 12/2010 |
| EP | 2003762 A2 | 12/2008 |
| EP | 2267862 A2 | 12/2010 |
| JP | 200003630652000 | 6/2002 |
| WO | 2011032410 A1 | 3/2011 |

OTHER PUBLICATIONS

International Preliminary Report on Patentability for corresponding application PCT/CN2011/078494; Report dated Dec. 17, 2013.
Len Sherman, "The Basics of USB Battery Charging: A Survival Guide", Maxim Integrated, Tutorial 4803, Dec. 9, 2010, URL-Application Note 4803: http://www.maximintegrated.com/an4803, pp. 1-15.
Written Opinion for corresponding application PCT/CN2011/078494 filed Aug. 16, 2011; Mail date Mar. 22, 2012.
European Search Report for corresponding application EP 11 86 7816; Report dated Oct. 17, 2014.

* cited by examiner

MOBILE TERMINAL THAT DETERMINES A TYPE OF AN EXTERNAL DEVICE

FIELD OF THE INVENTION

The disclosure relates to the field of mobile communications, and in particular to a mobile terminal and a processing method thereof.

BACKGROUND OF THE INVENTION

With the miniaturization of mobile terminal (e.g., mobile phone) and the diversification of function of mobile terminal, the problems of high power consumption and heating of the mobile terminal have become increasingly acute, which affect the service life of product and even personal safety. For high-end operators, which pay more attention to user experience and quality details of product, in Europe, America, and Japan, requirement for temperature rise control has become a rigid target. For example, a certain operator requires that if a charger is in an extreme working status of charging while calling with the maximum power, then the highest temperature of the surface of the mobile terminal is not allowed to exceed 43 degrees centigrade.

The cause of heating of the mobile terminal is great working current, especially, the working status of maintaining a cellular connection while charging is the most serious heating condition, that is to say, heat source of the mobile terminal is the baseband Power Management (PM) module and the radio frequency Power Amplifier (PA) module. For the baseband PM module, a plug-and-charge charge mode is usually adopted in the conventional art. However, the plug-and-charge charge mode has the following problems.

(1) Service life of lithium battery of the mobile terminal is closely related to charge and discharge times. When the mobile terminal only needs to transmit data with Personal Computer (PC) and the battery power of the mobile terminal is comparatively adequate, the plug-and-charge charge mode definitely increases extra charge and discharge times of battery, which severely affects the service life of the battery.

(2) Charging in standby mode has little impact on heating of the mobile terminal, but charging in call mode severely exacerbates the problem.

In addition, for the radio frequency PA, especially under condition of transmission with high power (e.g., 23 dbm) the communication current may up to hundreds of milliamperes (mA). In view of balance of radio frequency specification, optimization of the communication current itself is limited.

Thus, in the conventional art, the problem of heating of the mobile terminal is usually alleviated through heat dissipation way. For example, there are more utility models, such as novel heat conduction materials and novel design schemes of structure moulds. However, research on technical innovation of fundamental solutions for power consumption control combining the baseband with the radio frequency of the mobile terminal has not deeply investigated.

SUMMARY OF THE INVENTION

The disclosure provides a processing solution for mobile terminal, for at least solving the problem in relevant technologies that the problem of heating of the mobile terminal cannot be alleviated fundamentally through heat dissipation way.

According to an aspect of the disclosure, a processing method for mobile terminal is provided.

The processing method for mobile terminal according to the disclosure includes the following steps: a mobile terminal determines the type of an external device according to the logic levels of the internal data signal lines in the mobile terminal when the mobile terminal detects that the external device is plugged in, wherein the type includes a charger and a Universal Serial Bus (USB) host device; the mobile terminal charges itself or transmits data with the external device according to the determined type of the external device.

Preferably, the mobile terminal determine the type of the external device according to logic levels of internal data signal lines of the mobile terminal includes: a baseband chip of the mobile terminal reads the logic levels of the internal data signal lines; the mobile terminal determines that the type of the external device is an USB host device under condition that logic level of a positive signal line in the internal data signal lines is low and logic level of a negative signal line in the internal data signal lines is low; the mobile terminal determines that the type of the external device is a charger under condition that logic level of the positive signal line is high and logic level of the negative signal line is low.

Preferably, the mobile terminal charges itself or transmits data with the external terminal according to the determined type of the external device includes: if the type of the external device is a charger, the mobile terminal starts a charging process; if the type of the external device is an USB host device, the mobile terminal detects current battery power of the mobile terminal; under condition that the battery power of the mobile terminal is greater than a preset value, the mobile terminal transmits data with the external device; or else, the mobile terminal starts the charging process.

Preferably, after the mobile terminal starts the charging process, the method further includes: the mobile terminal periodically monitors whether temperature of the mobile terminal exceeds a threshold; if so, the mobile terminal stops the charging process under condition that the actual working mode of the mobile terminal is call mode.

Preferably, after the mobile terminal stops the charging process, the method further includes: the mobile terminal monitors the battery voltage of the mobile terminal in real time; when the battery voltage is lower than a preset voltage value, the mobile terminal restarts the charging process.

Preferably, the mobile terminal periodically monitors whether the temperature of the mobile terminal exceeds the threshold includes: the mobile terminal collects temperature sensitive parameters via a baseband control chip, and determines whether the temperature of the mobile terminal exceeds the threshold according to the collected temperature sensitive parameters, wherein objects from which the temperature sensitive parameters are collected includes one of the following: communication current intensity of a radio frequency Power Amplifier (PA) of the mobile terminal, receiver of the mobile terminal, which is configured with a temperature sensor, battery in the mobile terminal, which carries temperature impedance characteristic, and working mode of the mobile terminal, which is acquired from a mode register.

According to another aspect of the disclosure, a mobile terminal is provided.

The mobile terminal according to the disclosure includes: a determining module, configured to determine type of an external device according to logic levels of internal data signal lines in the mobile terminal when the mobile terminal detects that the external device is plugged in, wherein the type includes a charger and an USB host device; a processing module, configured to charge or transmit data according to the determined type of the external device.

Preferably, the processing module includes: a charging unit, configured to start a charging process under condition that the determining module determines the type of the external device is a charger, and start a charging process under condition that the determining module determines the type of the external device is the USB host device and battery power of the mobile terminal is less than or equal to the preset value; a data transmitting unit, configured to transmit data with the external device under condition that the determining module determines the type of the external device is an USB device and the battery power is greater than the preset value.

Preferably, the charging unit is further configured to, after starting the charging process, collect temperature sensitive parameters via a baseband control chip of the mobile terminal, and determine whether temperature of the mobile terminal exceeds a threshold according to the collected temperature sensitive parameters, wherein objects from which the temperature sensitive parameters are collected includes one of the following: communication current intensity of a radio frequency Power Amplifier (PA) of the mobile terminal, receiver of the mobile terminal, which is configured with a temperature sensor, battery in the mobile terminal, which carries temperature impedance characteristic, and working mode of the mobile terminal, which is acquired from a mode register.

According to another aspect of the disclosure, a mobile terminal is further provided.

The mobile terminal according to the disclosure includes a circuit for identifying type of an external device and a baseband control chip, wherein, the circuit for identifying the type of the external device includes internal data signal lines; a positive signal line in the internal data signal lines is configured with a pull-up resistor which is connected to USB voltage value, and a negative signal line in the internal data signal lines is configured with a pull-down resistor which is grounded; the baseband control chip is configured to charge or transmit data according to logic levels of the positive signal line and the negative signal line.

Through the disclosure, in a way that when the mobile terminal detects that the external device is plugged in, the mobile terminal determines the type of the external device according to the logic levels of the internal data signal lines in the mobile terminal, and charges itself or transmits data with the external device according to the determined type of the external device, the problem, in relevant technologies, of heating of the mobile terminal cannot be alleviated fundamentally through heat dissipation way is solved, the performance of mobile terminal is improved, and the user experience is enhanced.

BRIEF DESCRIPTION OF THE DRAWINGS

The drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The disclosure is described below with reference to the accompanying drawings and embodiments in detail. Note that, embodiments and features in embodiments in the application can be combined with each other on condition of not conflicting.

Figure 1:
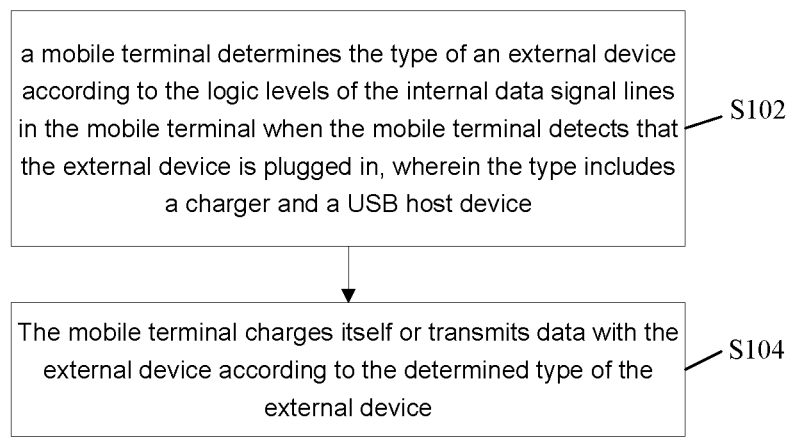
FIG. 1 shows a flowchart of a processing method for mobile terminal according to embodiment of the disclosure.

According to an embodiment of the disclosure, a processing method for mobile terminal is provided. FIG. 1 shows a flowchart of a processing method for mobile terminal according to the embodiment of the disclosure. The flowchart includes the following steps:

Step 102: when the mobile terminal detects that there is an external device is plugged in, the mobile terminal determines the type of the external device according to the logic levels of the internal data signal lines in the mobile terminal, wherein the type includes a charger and an USB host device (namely USB_HOST device);

Step 104: the mobile terminal charges itself or transmits data with the external device according to the determined type of the external device.

Through the above steps, in a way that when the mobile terminal detects that the external device is plugged in, the mobile terminal determines the type of the external device according to the logic levels of the internal data signal lines in the mobile terminal, and charges itself or transmits data with the external device according to the determined type of the external device, the problem, in relevant technologies, of heating of the mobile terminal cannot be alleviated fundamentally through heat dissipation way is solved, the performance of mobile terminal is improved, and the user experience is enhanced.

Preferably, in Step 102, the baseband chip of the mobile terminal can read the logic levels of the internal data signal lines in the mobile terminal. Under the condition that the logic level of the positive signal line in the internal data signal lines is low and the logic level of the negative signal line in the internal data signal lines is low, the mobile terminal determines that the type of the external device is an USB host device. Under the condition that the logic level of the positive signal line is high and the logic level of the negative signal line is low, the mobile terminal determines that the type of the external device is a charger. The method increases the effectiveness and accuracy of system.

Preferably, in Step 104, if the type of the external device is a charger, the mobile terminal starts the charging process; if the type of the external device is the USB host device, the mobile terminal detects its current battery power; under the condition that the battery power is greater than the preset value, the mobile terminal transmits data with the external device; or else, the mobile terminal starts a charging process. The method improves the adaptive capacity of the system.

Preferably, in Step 104, after the mobile terminal starts the charging process, the mobile terminal can periodically monitor whether its temperature exceeds a preset threshold; if so, the mobile terminal stops the charging process under the condition that the mobile terminal work in a call mode actually. The method is more accordant with situation of practical application and improves the flexibility of the system.

Preferably, after the mobile terminal stops the charging process, the mobile terminal can monitor its battery voltage in real time. When the battery voltage is lower than a preset voltage value, the mobile terminal restarts the charging process. Thus the processing capacity of the system is improved.

Preferably, the mobile terminal periodically monitoring whether its temperature exceeds the threshold includes the following steps: the mobile terminal collects the temperature sensitive parameters through its baseband control chip, and determines whether the temperature of the mobile terminal exceeds the threshold according to the collected temperature sensitive parameters, wherein the objects from which the temperature sensitive parameters are collected include one of the following: communication current intensity of radio frequency PA of the mobile terminal, the receiver of the mobile terminal, which is configured with a temperature sensor, the battery in the mobile terminal, which carries temperature impedance characteristic, and working mode of the mobile terminal, which is acquired from a status register. The method is simple to implement and strong in operability.

Figure 2:
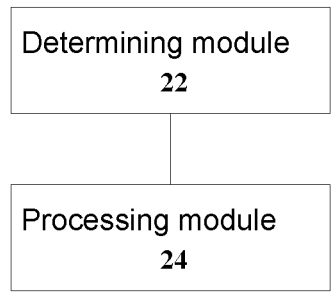
FIG. 2 shows a structure diagram of a mobile terminal according to embodiment of the disclosure.

Corresponding to the method, the embodiment of the disclosure further provides a mobile terminal. FIG. 2 shows a structure diagram of the mobile terminal according to the embodiment of the disclosure. As shown in FIG. 2, the mobile terminal includes: a determining module 22, which is configured to, upon detecting that an external device is plugged in, determine the type of the external device according to the logic levels of the internal data signal lines in the mobile terminal, wherein the type includes a charger and an USB host device; a processing module 24, which is coupled to the determining module 22 and configured to charge the mobile terminal or transmit data with the external terminal according to the determined type of the external device.

Through the above mobile terminal, in a way that when the determining module 22 detects that the external device is plugged in, the mobile terminal determines the type of the external device according to the logic levels of its internal data signal lines, and the processing module 24 charges or transmits data according to the determined the type of external device, the problem, in relevant technologies, of heating of the mobile terminal cannot be alleviated fundamentally through heat dissipation way is solved, thus the performance of mobile terminal is improved, and the user experience is enhanced.

Figure 3:
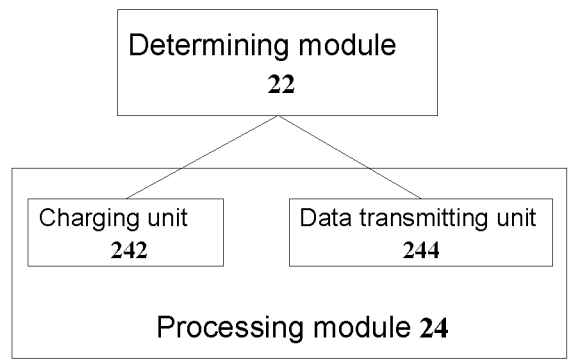
FIG. 3 shows a structure diagram of a mobile terminal according to a preferred embodiment of the disclosure.

FIG. 3 shows a structure diagram of a mobile terminal according to a preferred embodiment of the disclosure. As shown in FIG. 3, the processing module 24 includes: a charging unit 242, which is coupled to the determining module 22 and configured to start the charging process under the condition that the determining module 22 determines the type of the external device is a charger, and start the charging process under the condition that the determining module 22 determines the type of the external device is an USB host device and the battery power of the mobile terminal is less than or equal to the preset value; the data transmitting unit 244, which is coupled to the determining module 22 and configured to transmit data with the external device under the condition that the determining module 22 determines the type of the external device is an USB host device and the battery power is greater than the preset value.

Preferably, the charging unit 242 is further configured to, after starting the charging process, collect the temperature sensitive parameters through the baseband control chip of the mobile terminal, and determine whether the temperature of the mobile terminal exceeds a preset threshold according to the collected temperature sensitive parameters, wherein the objects from which the temperature sensitive parameters include one of the following: communication current intensity of the radio frequency PA of the mobile terminal, the receiver of the mobile terminal, which is configured with a temperature sensor, the battery in the mobile terminal, which carries a temperature impedance characteristic, and working mode of the mobile terminal, which is acquired from a status register.

Figure 4:
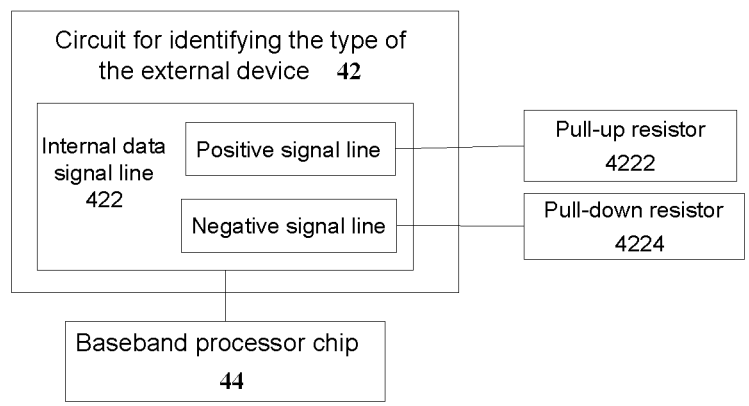
FIG. 4 shows a structure diagram of a mobile terminal according to another preferred embodiment of the disclosure.

According to an embodiment of the disclosure, a mobile terminal is further provided. FIG. 4 shows a structure diagram of the mobile terminal according to another preferred embodiment of the disclosure. As shown in FIG. 4, the mobile terminal includes a circuit for identifying the type of the external device 42 and a baseband control chip 44, wherein, the circuit for identifying type of external device 42 includes internal data signal lines 422; the positive signal line in the internal data signal lines 422 is configured with a pull-up resistor 4222 which is connected to USB voltage value, and the negative signal line in the internal data signal lines is configured with a pull-down resistor 4224 which is grounded; the baseband control chip 44 is coupled to the internal data signal lines 422 and configured to charge or transmit data according to the logic levels of the positive signal line and the negative signal line.

Implementation process of the above-mentioned embodiments is described below with reference to the preferred embodiments and the accompanying drawings in detail.

Embodiment 1

The embodiment takes mobile terminal for example. Aiming at two heat sources, namely the baseband PM module and the radio frequency PA module, of mobile phone, a method and a device for baseband charge power supply management with reference to working status of the radio frequency PA, the battery power, the temperature of battery and the type of charge power supply are designed. Through the method and the device, the problem of heating control design of mobile phone can be effectively solved, the user experience is enhanced, and the market competitiveness of product is improved. At the same time, the service life of the battery of mobile phone can be prolonged, which reflects a green and environment-friendly design.

Figure 5:
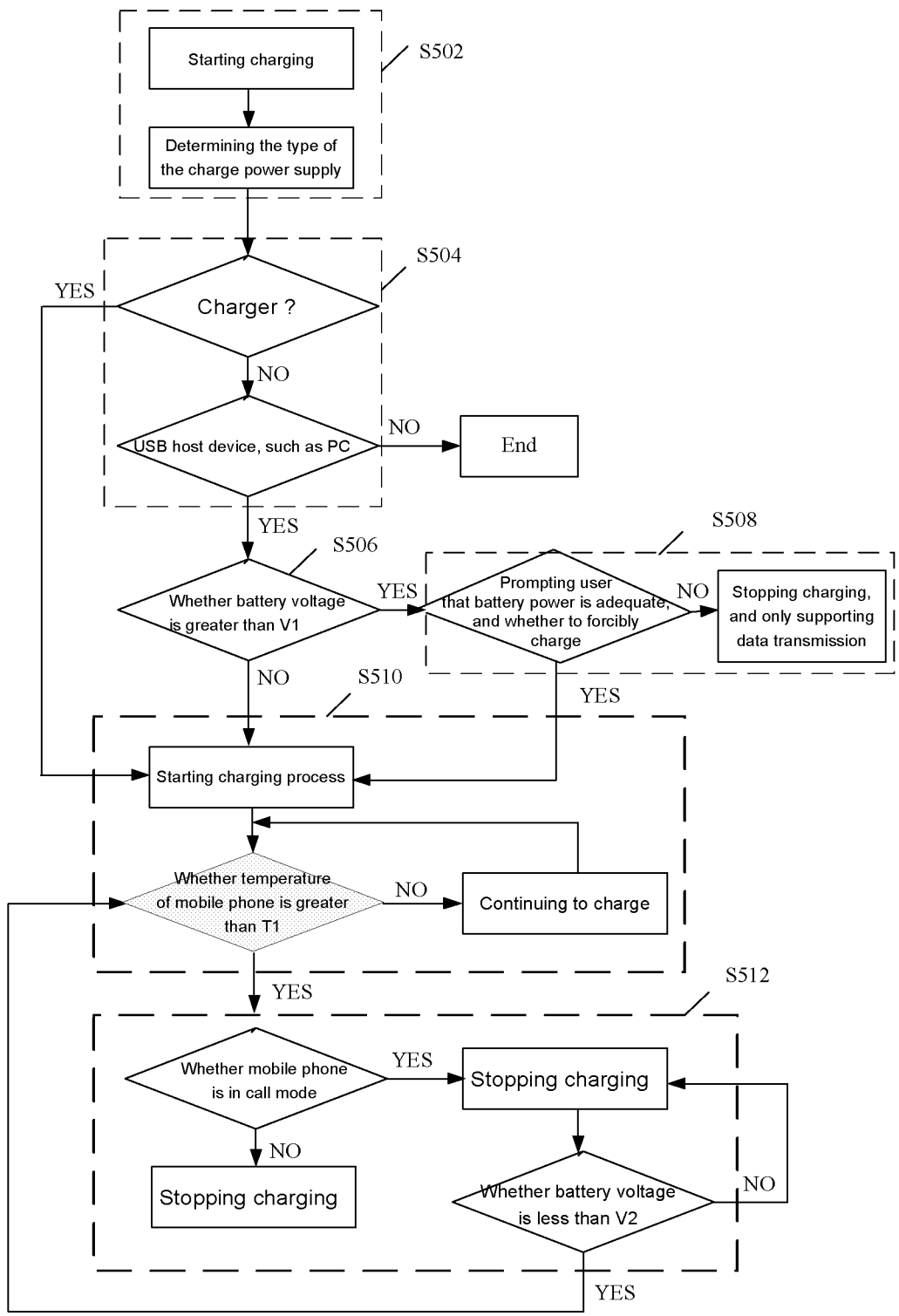
FIG. 5 shows a flowchart of heating control for mobile phone according to embodiment 1 of the disclosure.

FIG. 5 shows a flowchart of heating control for mobile phone according to embodiment 1 of the disclosure. As shown in FIG. 5, the control flow is described below.

Step 502: after user plugs a data cable or a charger into a mobile terminal, a baseband chip of the mobile phone first determines the type of charge power supply.

Step 504: if the baseband chip determines that a charger is plugged in by the user, then it is indicated that the use intent to charge the mobile phone, and the mobile terminal directly turn to phase of starting a charging process. If the baseband chip determines that an USB host device, such as a PC, is plugged in by user, then entering Step S506. If the baseband chip determines that neither the charger nor the USB host device, such as PC, is plugged in by user, then ending the control flow.

Step 506: because the user may just want to transmit data, a function of detecting battery power is added in software. If battery power is comparatively adequate (e.g., determining that the battery voltage is greater than V1, wherein value of V1 can be set by the mobile phone providers themselves, like 70% of the full power), then entering Step 508. If determining that the battery power is less than or equal to V1, then starting the charging process unconditionally, namely entering Step 510.

Step 508: prompting user that the battery power is comparatively adequate and whether to forcibly charge. For example, at this point, the user can press a certain key (e.g., the OK key) to forcibly charge while transmitting data. The user can also select to not forcibly charge, but only transmit data, so as to achieve the purpose of prolonging the service life of battery by reducing charge and discharge times of the battery.

Step 510: after the mobile phone starts the charging process, it is required to determine whether the temperature of the mobile phone exceeds a threshold T1 (T1 is the highest temperature value required by operator or a temperature value that makes user feel uncomfortable, for example, 43 degrees centigrade) in real time. If not, continuing to charge and monitor the temperature value in real time; if so, entering Step 512.

Step 512: determining the main cause that the temperature exceeds the preset value. In implementation process, it can be: first, the software acquires working status of the mobile phone, and judges whether the mobile phone is in a call mode; if the mobile phone is in a call mode, it is indicated that the temperature rise of mobile phone is mainly caused by maintaining the call mode while charging, and stops the charging at this time; further, the software monitors whether the battery voltage of the mobile phone is lower than V2 (V2 is the lowest voltage value that enables mobile phone to maintain a call mode, for example, 3.6V) in real time; if the battery voltage of the mobile phone is lower than V2, then returns to Step 510 to determine whether need to restart the charging process; if the battery voltage of mobile phone is higher than V2, then keep the status of stopping charging and monitor the battery voltage value in real time.

Preferably, if the mobile phone is not in call mode (namely, in standby mode), and the temperature of the mobile phone exceeds T1, it is indicated that there are hardware problems or other problems existing in the mobile phone, stopping charging, and ending the flow.

It can be seen that compared with the traditional art, the embodiment performs the baseband chip power supply management by combining actual working mode of radio frequency module of the mobile phone, detection of the battery power and the temperature of battery, and discrimination of the type of charge power supply, which improves the plug-and-charge mode in the conventional art, and fundamentally improves the problem of heating of the mobile phone, and gets rid of extra cost and design difficulty caused by taking avoiding measures, such as heat conduction material and structure mould.

Embodiment 2

Figure 6:
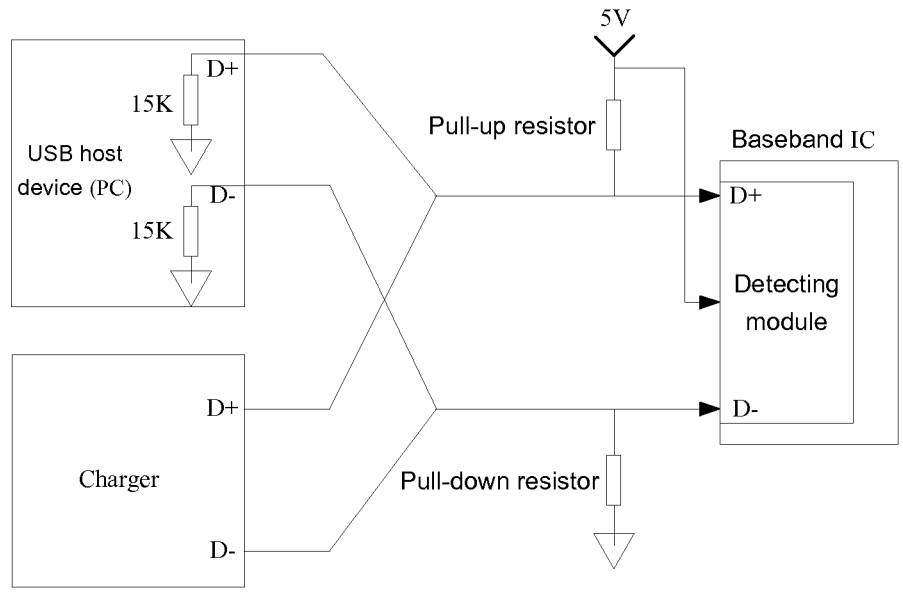
FIG. 6 shows a diagram of a discrimination circuit for type of charge power supply according to embodiment 2 of the disclosure.

FIG. 6 shows a diagram of a circuit for discriminating the type of charge power supply according to embodiment 2 of the disclosure. As shown in FIG. 6, there are two pull-down resistors of 15K designed on the internal data signal lines D+ and D− inside the USB_HOST device according to the USB specification. It is required to additionally design a weak pull-up resistor which is connected to USB voltage of 5V and a weak pull-down resistor which is grounded to signal lines D+ and D− of the mobile phone, respectively. For charger, its signals D+ and D− enter the baseband control chip of the mobile phone through the pull-up resistor and the pull-down resistor.

In implementation process, processing heating of the mobile phone in the embodiment can include the following steps.

Step 1: after the baseband chip determines that a device is plugged in, the baseband chip read the logic levels of the signals lines D+ and D−. If the combination state of the logic levels is "00", then the type of the external charge power supply is the USB_HOST device. If the combination state of the logic levels is "10", then the type of the external charge power supply is the charger.

Figure 7:
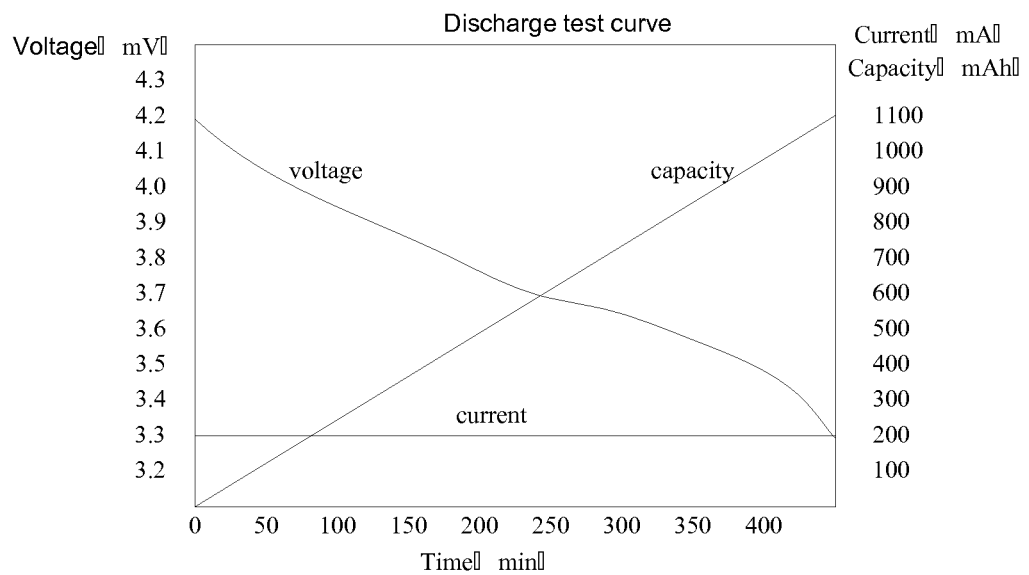
FIG. 7 shows a diagram of a correspondence between battery power and battery voltage according to embodiment 2 of the disclosure.

Step 2: if the determination of the type of the charge power supply is the USB_HOST device, the mobile phone needs to detect the current battery power. The current battery power can be indirectly acquired by detecting the battery voltage and the corresponding relationship between the battery power and the battery voltage can be obtained through the discharge test curve provided by manufacturer of the mobile phone battery. FIG. 7 shows a diagram of the corresponding relationship between the battery power and the battery voltage according to embodiment 2 of the disclosure. As shown in FIG. 7, the voltage values respectively corresponding to the battery powers can be obtained from the discharge test curve, the software of the mobile terminal sets the corresponding relationship between the battery power and the battery voltage, and determining whether to charge according to the battery power to which the preset charge threshold V1 corresponds and which serves as a standard.

Step 3: detecting temperature of mobile phone. In the implementation process, there are several detection schemes for choose according to heating parts of the mobile phone and the requirements of user as follows.

Figure 8A:
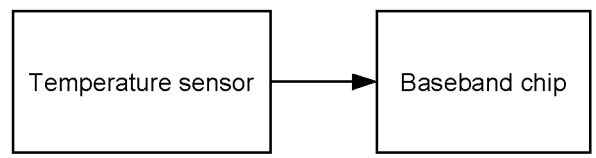
FIG. 8a shows a diagram of example 1 for detecting temperature of mobile phone according to embodiment 2 of the disclosure.

(1) Using a temperature sensor. FIG. 8a shows a diagram of example 1 for detecting temperature of the mobile phone according to the embodiment 2 of the disclosure. As shown in FIG. 8a, the collected temperature values of the parts with higher temperature during operating of the mobile phone (radio frequency PA module and PM module) and the parts close to human skin are processed by the baseband control chip, and determine whether the collected temperature values exceed the threshold T1, and the baseband control chip processes correspondingly.

Figure 8B:
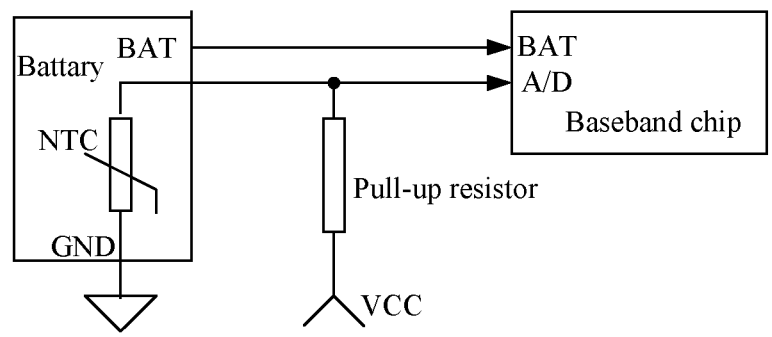
FIG. 8b shows a diagram of example 2 for detecting temperature of mobile phone according to embodiment 2 of the disclosure.

(2) The temperature of battery is an important reference value for representing heating characteristic of the mobile phone in charge mode and call mode, so the battery which internally carries temperature impedance characteristic is used for realizing the function of detecting temperature. FIG. 8b shows a diagram of example 2 for detecting temperature of mobile phone according to embodiment 2 of the disclosure. As shown in FIG. 8b, Negative Temperature Coefficient (NTC) resistance of battery with NTC changes with the change of the temperature of the battery; so the Analogue/Digital (ND) sampling channel of the baseband chip of the mobile phone will collect different temperature values and determine whether these collected temperature values exceed the threshold T1, and the baseband control chip processes correspondingly.

Step 4: acquiring working status of mobile phone. For example, it can be learned that the mobile phone is in call mode or standby mode by reading relevant register through software.

It can be seen that the embodiment is a solution of heating control for mobile phone aiming at different heat sources. For users, it improves safety and comfort during using product, prolongs the service life of battery, and enhances the user experience. For program of mobile phone and terminal provider, the embodiment can fundamentally solve the problem of heating of the mobile phone while enhancing humanization and intellectualization design of product, and improving the market competitiveness and commercial added value.

In conclusion, the embodiments of the disclosure provide a method and a device for adjusting working current in real time to reduce power consumption of the mobile terminal and reduce heat with reference to the actual working status of the mobile terminal, temperature, the type of the external device, battery power and so on, improve the conventional plug-and-charge mode, fundamentally solves the problem of heating of the mobile phone, and gets rid of extra cost and design difficulty caused by taking avoiding measures, such as heat conduction material and structure mould.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

What is claimed is:

1. A processing method for mobile terminal, comprising:
   a mobile terminal determining, when the mobile terminal detects that an external device is plugged in, the type of the external device according to logic levels of internal data signal lines in the mobile terminal, wherein the type comprises a charger and a Universal Serial Bus (USB) host device; and
   according to the determined type of the external device, the mobile terminal charging or transmitting data;
   wherein the mobile terminal determining the type of the external device according to logic levels of internal data signal lines of the mobile terminal comprises:
   a baseband chip of the mobile terminal reading the logic levels of the internal data signal lines;
   the mobile terminal determining that the type of the external device is an USB host device under condition that logic level of a positive signal line in the internal data signal lines is low and logic level of a negative signal line in the internal data signal lines is low; and
   the mobile terminal determining that the type of the external device is a charger under condition that logic level of the positive signal line is high and logic level of the negative signal line is low.

2. The method according to claim 1, wherein the mobile terminal charging or transmitting data according to the determined type of the external device comprises:
   if the type of the external device is a charger, the mobile terminal starting a charging process;
   if the type of the external device is an USB host device, the mobile terminal detecting current battery power of the mobile terminal; and
   under condition that the battery power of the mobile terminal is greater than a preset value, the mobile terminal transmitting data with the external device; or else, the mobile terminal starting the charging process.

3. The method according to claim 2, wherein after the mobile terminal starting the charging process, the method further comprises:

the mobile terminal periodically monitoring whether temperature of the mobile terminal exceeds a threshold; and
   if so, the mobile terminal stopping the charging process under condition that actual working mode of the mobile terminal is call mode.

4. The method according to claim 3, wherein after the mobile terminal stopping the charging process, the method further comprises:
   the mobile terminal monitoring battery voltage of the mobile terminal in real time; and
   when the battery voltage is lower than a preset voltage value, the mobile terminal restarting the charging process.

5. The method according to claim 3, wherein the mobile terminal periodically monitoring whether the temperature of the mobile terminal exceeds the threshold comprises:
   the mobile terminal collecting temperature sensitive parameters via a baseband control chip, and determining whether the temperature of the mobile terminal exceeds the threshold according to the collected temperature sensitive parameters, wherein objects from which the temperature sensitive parameters are collected comprises one of the following: communication current intensity of a radio frequency Power Amplifier (PA) of the mobile terminal, receiver of the mobile terminal, which is configured with a temperature sensor, battery in the mobile terminal, which carries temperature impedance characteristic, and working mode of the mobile terminal, which is acquired from a mode register.

6. A mobile terminal, comprising:
   a determining module, configured to determine, when the mobile terminal detects that an external device is plugged in, the type of the external device according to logic levels of internal data signal lines in the mobile terminal, wherein the type comprises a charger and an USB host device; and
   a processing module, configured to, according to the determined type of the external device, charge or transmit data;
   wherein the processing module comprises:
   a charging unit, configured to start a charging process under condition that the determining module determines the type of the external device is a charger, and start a charging process under condition that the determining module determines the type of the external device is the USB host device and battery power of the mobile terminal is less than or equal to the preset value; and
   a data transmitting unit, configured to transmit data with the external device under condition that the determining module determines the type of the external device is an USB device and the battery power is greater than the preset value.

7. The mobile terminal according to claim 6, wherein the charging unit is further configured to, after starting the charging process, collect temperature sensitive parameters via a baseband control chip of the mobile terminal, and determine whether temperature of the mobile terminal exceeds a threshold according to the collected temperature sensitive parameters, wherein objects from which the temperature sensitive parameters are collected comprises one of the following: communication current intensity of a radio frequency Power Amplifier (PA) of the mobile terminal, receiver of the mobile terminal, which is configured with a temperature sensor, battery in the mobile terminal, which carries temperature impedance characteristic, and working mode of the mobile terminal, which is acquired from a mode register.

8. The mobile terminal according to claim 6, wherein the determining module is a circuit for identifying type of an external device, and the processing module is a baseband control chip, wherein, the circuit for identifying the type of the external device comprises internal data signal lines; a positive signal line in the internal data signal lines is configured with a pull-up resistor which is connected to USB voltage value, and a negative signal line in the internal data signal lines is configured with a pull-down resistor which is grounded; and the baseband control chip is configured to charge or transmit data according to logic levels of the positive signal line and the negative signal line.

* * * * *